United States Patent
Takeshita

(10) Patent No.: US 10,290,881 B2
(45) Date of Patent: May 14, 2019

(54) HYDROGEN SUPPLY PIPING AND METHOD OF MANUFACTURING HYDROGEN SUPPLY PIPING

(71) Applicant: TOYOTA JIDOSHA KABUSHIKI KAISHA, Toyota-shi, Aichi-ken (JP)

(72) Inventor: Masahiro Takeshita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 188 days.

(21) Appl. No.: 14/881,183

(22) Filed: Oct. 13, 2015

(65) Prior Publication Data

US 2016/0111739 A1   Apr. 21, 2016

(30) Foreign Application Priority Data

Oct. 15, 2014   (JP) ................. 2014-210383

(51) Int. Cl.
| | |
|---|---|
| B29C 63/18 | (2006.01) |
| H01M 8/04082 | (2016.01) |
| F16L 9/21 | (2006.01) |
| F16L 9/147 | (2006.01) |
| B29C 63/08 | (2006.01) |

(Continued)

(52) U.S. Cl.
CPC ......... *H01M 8/04201* (2013.01); *B29C 63/08* (2013.01); *B29C 63/18* (2013.01); *F16L 9/147* (2013.01); *F16L 9/21* (2013.01); *B29C 53/083* (2013.01); *B29C 63/42* (2013.01); *B29L 2023/22* (2013.01); *H01M 2250/20* (2013.01); *Y02T 90/32* (2013.01)

(58) Field of Classification Search
CPC .......... H01M 8/04201; H01M 2250/20; B29C 63/08; B29C 63/18; B29C 63/42; B29C 53/083; F16L 9/147; F16L 9/21; Y02T 90/32
USPC ........................................ 138/110
See application file for complete search history.

(56) References Cited

U.S. PATENT DOCUMENTS

| | | | | |
|---|---|---|---|---|
| 4,245,674 A | * | 1/1981 | Nakamura | .......... B29C 63/0069 138/109 |
| 4,559,973 A | * | 12/1985 | Hane | .................. B29C 61/0616 138/138 |

(Continued)

FOREIGN PATENT DOCUMENTS

| | | |
|---|---|---|
| DE | 10 2008 045 689 A1 | 3/2010 |
| JP | S60-134626 U | 9/1985 |

(Continued)

*Primary Examiner* — Craig M Schneider
*Assistant Examiner* — David R Deal
(74) *Attorney, Agent, or Firm* — Finnegan, Henderson, Farabow, Garrett & Dunner, LLP

(57) ABSTRACT

There is provided a hydrogen supply piping for supplying hydrogen to a fuel cell, the hydrogen supply piping includes a flow path pipe member through which the hydrogen flows, and a coating member having a tube shape for covering an outer surface of the flow path pipe member. The coating member is divided into a plurality of divided pieces in pipe axis directions of the hydrogen supply piping. The divided pieces are disposed in the pipe axis directions so that an end of one of the divided pieces overlaps with an end of the adjacent divided piece. The divided pieces are wrapped tightly around an outer surface of the flow path pipe member by thermal contraction.

2 Claims, 5 Drawing Sheets

(51) Int. Cl.
*B29L 23/00* (2006.01)
*B29C 53/08* (2006.01)
*B29C 63/42* (2006.01)

(56) References Cited

U.S. PATENT DOCUMENTS

| | | | | |
|---|---|---|---|---|
| 4,671,833 | A | * | 6/1987 | Bradford ............. B29C 63/0069 156/86 |
| 5,009,730 | A | * | 4/1991 | Tozier ..................... B25G 1/10 156/85 |
| 5,800,762 | A | * | 9/1998 | Bethel .................. H02G 3/0481 264/132 |
| 5,962,155 | A | * | 10/1999 | Kuranaka ......... H01M 8/04007 429/434 |
| 6,117,257 | A | * | 9/2000 | Takahashi ............... B29C 63/18 156/86 |
| 6,265,065 | B1 | * | 7/2001 | McCallion ............. B29C 63/42 174/394 |
| 6,403,889 | B1 | * | 6/2002 | Mehan ..................... B32B 1/08 174/120 R |
| 6,494,760 | B1 | * | 12/2002 | Kessler ................. A63B 19/00 446/236 |
| 6,752,633 | B2 | * | 6/2004 | Aizawa .................. H01R 9/034 439/579 |
| 6,797,218 | B1 | * | 9/2004 | Bickerstaff ............ B29C 61/10 264/230 |
| 7,363,775 | B2 | | 4/2008 | Pechtold |
| 2005/0126715 | A1 | * | 6/2005 | Hong .................... B29C 63/423 156/459 |
| 2005/0161145 | A1 | * | 7/2005 | Record .................... F41H 3/00 156/84 |
| 2010/0003577 | A1 | | 1/2010 | Eguchi et al. |

FOREIGN PATENT DOCUMENTS

| | | |
|---|---|---|
| JP | 2002-235894 A | 8/2002 |
| JP | 2006-32106 A | 2/2006 |
| JP | 2006-329786 A | 12/2006 |
| JP | 2007-042433 | 2/2007 |
| JP | 2008-144664 | 6/2008 |
| JP | 2010-015848 | 1/2010 |
| JP | 2010-212121 | 9/2010 |
| JP | 2010-218753 | 9/2010 |
| JP | 2010-267556 | 10/2010 |
| JP | 2011-113697 | 6/2011 |
| JP | 2014-160541 | 9/2014 |

* cited by examiner

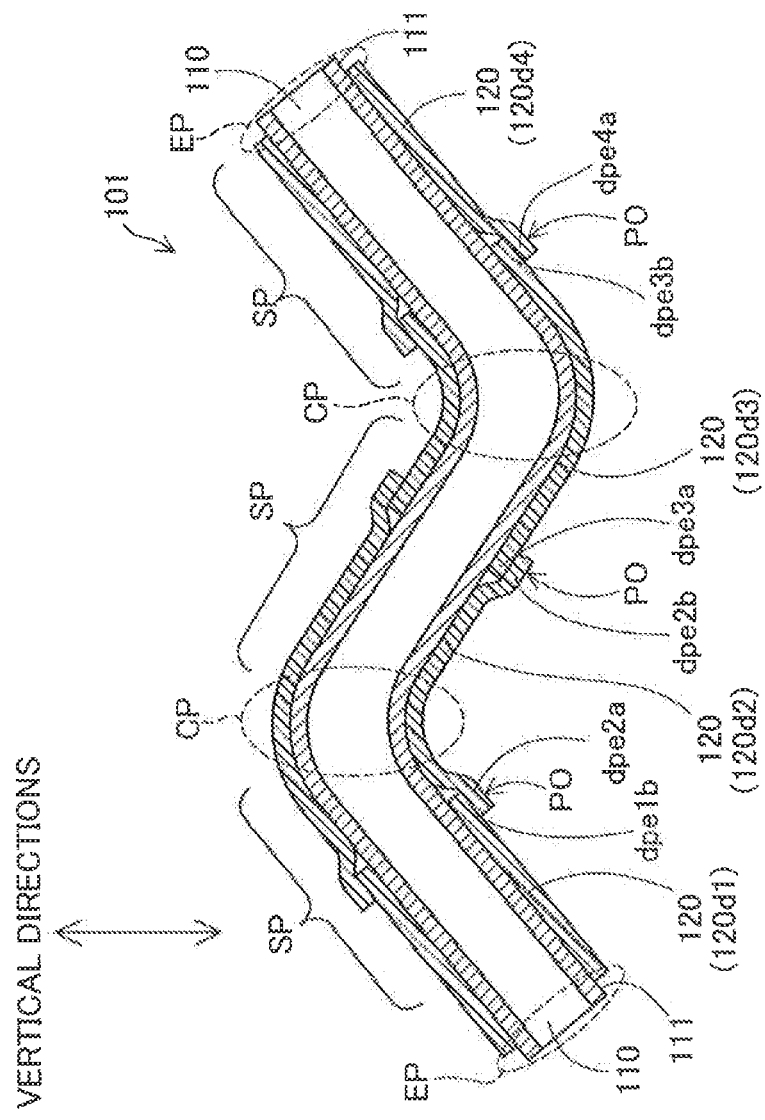

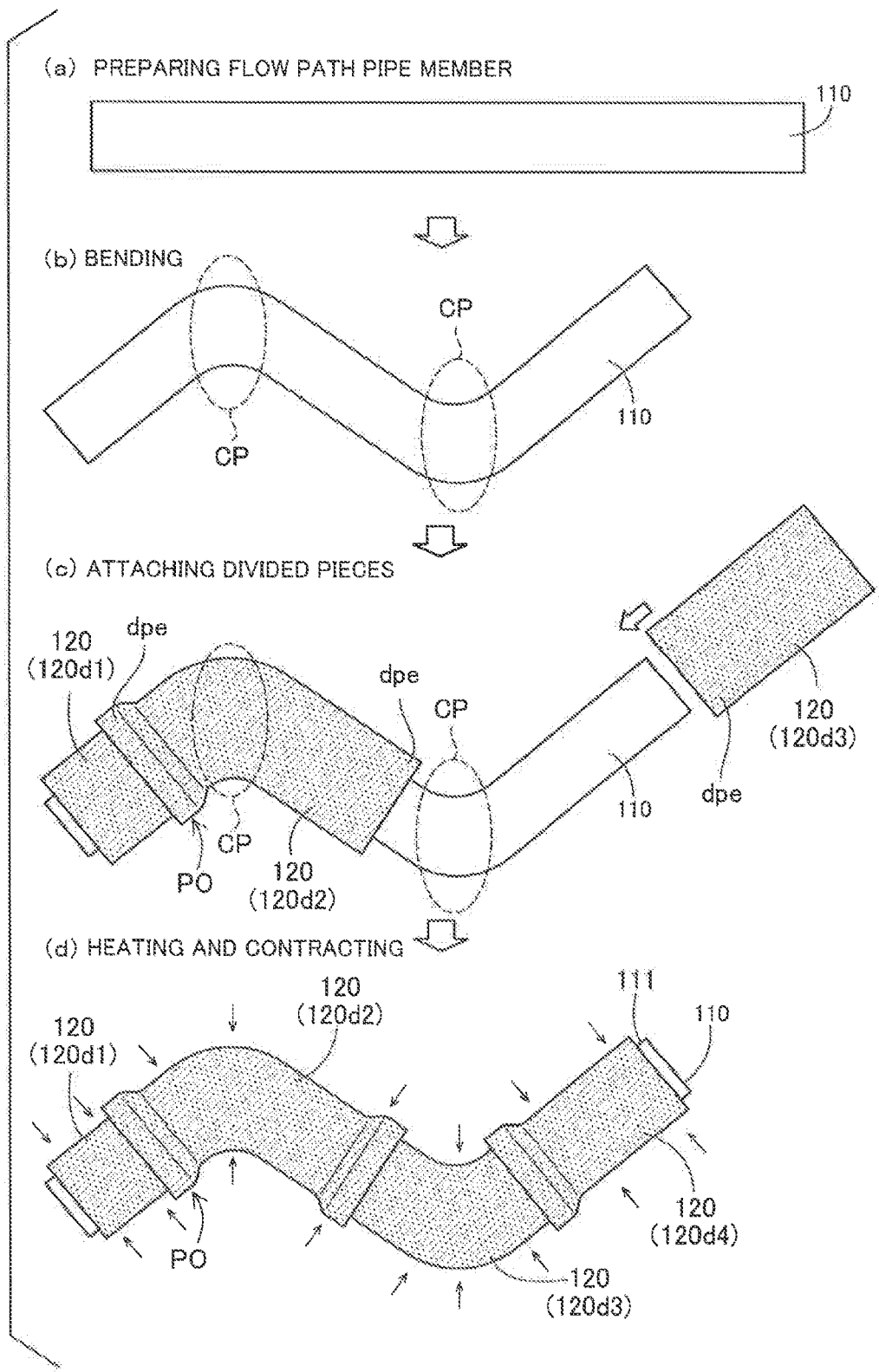

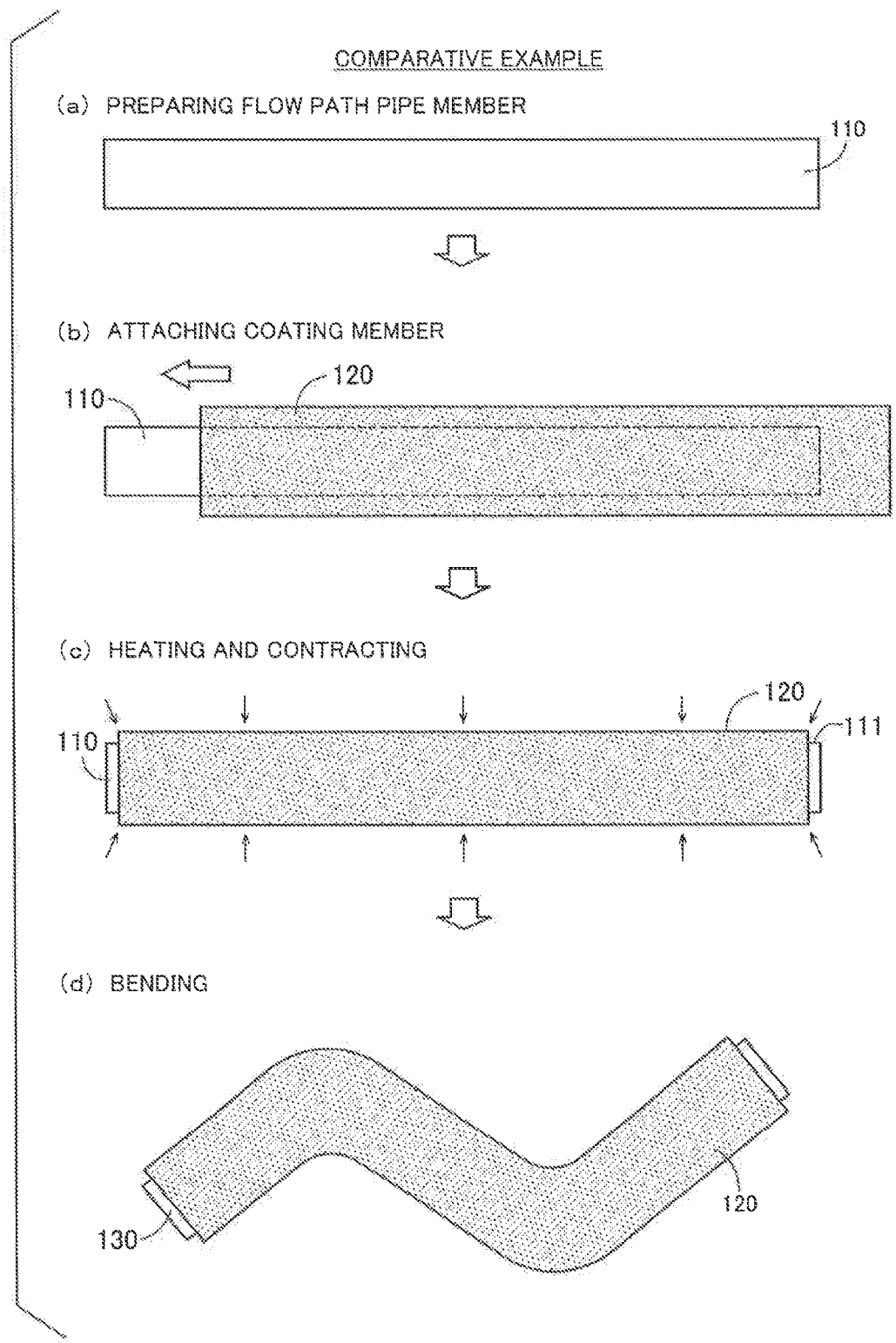

HYDROGEN SUPPLY PIPING AND METHOD OF MANUFACTURING HYDROGEN SUPPLY PIPING

CROSS REFERENCE TO RELATED APPLICATION

This application claims priority based on Japanese Patent Application No. 2014-210383, filed on Oct. 15, 2014, the contents of all of which are incorporated herein by reference in their entirety.

BACKGROUND

Field

The present invention relates to a hydrogen supply piping for supplying hydrogen to a fuel cell, and a method of manufacturing the hydrogen supply piping.

Related Art

Conventionally, it is known that a hydrogen supply piping which is a piping for supplying hydrogen which is fuel gas to a fuel cell, as disclosed in JP2007-42433A and JP2014-160541A. When hydrogen inside a hydrogen tank flows into the hydrogen supply piping via an injector, pulsations of hydrogen in the hydrogen supply piping may be caused and, thus, radiation noise may be generated due to the pulsations. In a vehicle to which the fuel cell is mounted, the radiation noise may be transmitted into a cabin and, thus, there is a problem of reducing the quality of the product.

The inventor of the present application found out that the following various subjects arose when applying a method of solving the problem. For example, as one method for solving the problem, a hydrogen supply piping is assumed, which is a flow path pipe member through which hydrogen flows therein, covered with a coating member, such as a heat shrinkable tube. However, it is not easy to increase the thickness of the coating member which covers the flow path pipe member, due to manufacturing reasons described below. In other words, it is not easy to secure the noise insulation of the hydrogen supply piping by the coating member.

In order to manufacture the hydrogen supply piping in which the flow path pipe member is covered with the coating member, first, the heat shrinkable tube is attached onto the flow path pipe member before bending the flow path pipe member, and the heat shrinkable tube is thermally contracted by heating. The flow path pipe member of which an outer surface is wrapped tightly with the heat shrinkable tube is then bent into a particular shape. Such procedures must be in the order described above because it is not easy to attach the heat shrinkable tube over the flow path pipe member after the flow path pipe member is already bent. It is also not easy to bend the flow path pipe member of which an outer surface is not yet wrapped tightly with the heat shrinkable tube before the thermal contraction. Therefore, upon conducting the procedures, if the coating members have a large thickness after thermal contraction, the coating member may be damaged when the flow path pipe member on which the coating member is wrapped tightly is bent.

SUMMARY

The present invention is made in order to solve the subjects, and can be implemented in terms of the following aspects.

(1) According to one aspect of the invention, there is provided a hydrogen supply piping for supplying hydrogen to a fuel cell. The hydrogen supply piping includes a flow path pipe member through which the hydrogen flows, and a coating member having a tube shape for covering an outer surface of the flow path pipe member. The coating member is divided into a plurality of divided pieces in pipe axis directions of the hydrogen supply piping. The divided pieces are disposed in the pipe axis directions so that an end of one of the divided pieces overlaps with an end of the adjacent divided piece. The divided pieces are wrapped tightly around an outer surface of the flow path pipe member by thermal contraction. According to this structure, since the divided coating members are attached to the flow path pipe member after the flow path pipe member is bent, it is not necessary to bend the flow path pipe member after the coating members are wrapped tightly around the flow path pipe member. Therefore, even if the coating members have a large thickness after thermal contraction, the coating members can easily be wrapped tightly around the outer surface of the flow path pipe member after being bent, thereby improving a noise insulation of the hydrogen supply piping.

(2) In the hydrogen supply piping of the aspect described above, in a posture of the hydrogen supply piping in use, an end of one of the adjacent divided pieces located relatively above may cover an end of the other divided piece located relatively below. According to this structure, when the hydrogen supply piping is used, even if fluid, such as a water, adhered to the divided piece located above moves to the divided piece located below, the fluid can be prevented from entering into the divided pieces from the end of the divided piece located below.

(3) In the hydrogen supply piping of the aspect described above, the hydrogen supply piping may include a curved portion and a substantially straight extended portion connected with the curved portion. An overlapping portion that is a portion of the adjacent divided pieces where ends of the adjacent divided pieces are mutually overlapped may be located in the extended portion of the hydrogen supply piping. According to this structure, a sealing function between the ends of the adjacent divided pieces can more fully be secured.

(4) According to another aspect of the invention, there is provided a method of manufacturing a hydrogen supply piping for supplying hydrogen to a fuel cell. The method includes providing a flow path pipe member through which the hydrogen flows, bending the flow path pipe member, attaching a plurality of divided pieces, that is obtained by dividing a heat-shrinkable coating member having a tube shape, sequentially to the bent flow path pipe member, and thermally contracting the plurality of divided pieces attached to the flow path pipe member to wrap the plurality of divided pieces tightly around an outer surface of the flow path pipe member. According to this structure, since the divided coating members are attached to the flow path pipe member after the flow path pipe member is bent, it is not necessary to bend the flow path pipe member after the coating members are wrapped tightly around the flow path pipe member. Therefore, even if the coating members have a large thickness after thermal contraction, the coating members can easily be wrapped tightly around the outer surface of the flow path pipe member after being bent, thereby improving the noise insulation of the hydrogen supply piping.

(5) In the manufacturing method of the aspect described above, the attaching the plurality of divided pieces may include attaching the divided pieces so that, in a posture of the manufactured hydrogen supply piping in use, an end of one of the adjacent divided pieces located relatively above covers an end of the other divided piece located relatively below. According to this structure, when the manufactured hydrogen supply piping is used, even if fluid, such as a water, adhered to the divided piece located above moves to the divided piece located below, the fluid can be prevented from entering into the divided pieces from the end of the divided piece located below.

The present invention can be implemented in various forms, such as a fuel cell system including the hydrogen supply piping, a method of manufacturing the fuel cell system, and a fuel cell vehicle to which the fuel cell system is mounted.

BRIEF DESCRIPTION OF THE DRAWINGS

FIG. 3 is a cross-sectional view of the hydrogen supply piping member in a pipe axis direction;

FIG. 4 is a chart illustrating a method of manufacturing the hydrogen supply piping member; and FIG. 5 is a chart illustrating another manufacturing method as a comparative example.

DESCRIPTION OF THE EMBODIMENTS

Figure 1:
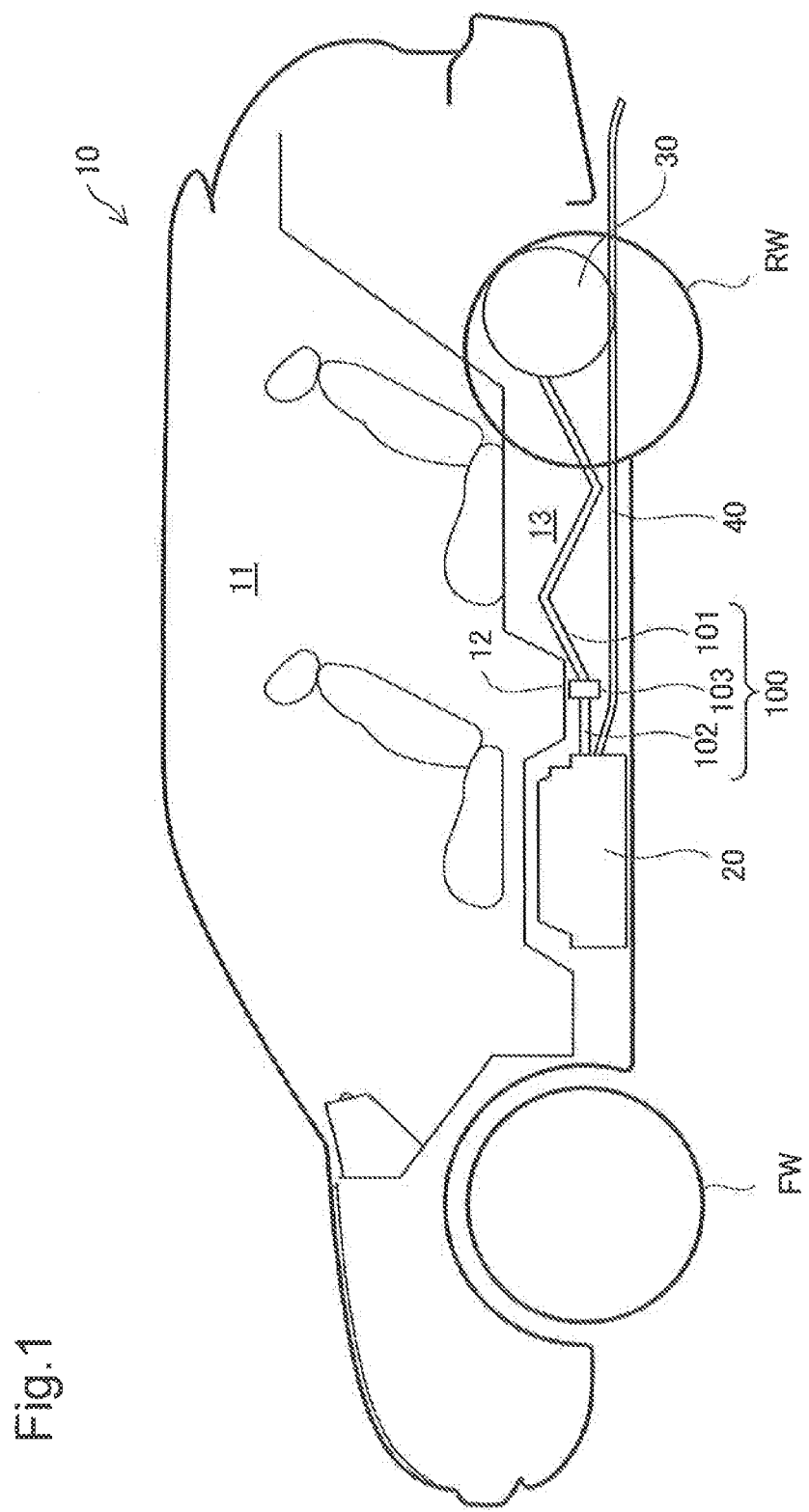
FIG. 1 is a view illustrating a fuel cell vehicle having a hydrogen supply piping of a first embodiment.

FIG. 1 is a view illustrating a fuel cell vehicle 10 having a hydrogen supply piping 100 of a first embodiment. The fuel cell vehicle 10 includes a fuel cell 20, a hydrogen tank 30, a hydrogen supply piping 100, and a gas-discharge and water-drain piping 40. The fuel cell 20 is disposed below an underbody 12 which defines a cabin 11, and is disposed within a cabin underfloor area 13 located between front wheels FW and rear wheels RW. The fuel cell 20 generates electric power in response to supplies of hydrogen gas and oxygen gas, and supplies the generated power to a drive motor (not illustrated). The hydrogen tank 30 is laterally mounted to a location below the underbody 12 and rearward from the fuel cell 20 toward the rear wheels RW. The fuel cell vehicle 10 may be provided with a plurality of hydrogen tanks 30. The fuel cell vehicle 10 may be provided with, for example, a radiator for cooling the fuel cell 20 and piping(s) through which refrigerant flows.

The hydrogen supply piping 100 is disposed between the hydrogen tank 30 and the fuel cell 20, and supplies hydrogen filling the hydrogen tank 30 to the fuel cell 20. The hydrogen supply piping 100 of this embodiment has a structure in which a plurality of hydrogen supply piping members 101 and 102 are connected together by connection(s) 103. The two types of hydrogen supply piping members 101 and 102 have similar structures, which will be described later in details. The connection 103 is comprised of a connection member, such as a connector or a connecting pipe, for example. The hydrogen supply piping 100 is not limited to be disposed between the hydrogen tank 30 and the fuel cell 20, but may be disposed between the hydrogen tanks 30 if the fuel cell vehicle 10 is provided with the plurality of hydrogen tanks 30. Further, valves, such as a pressure reducing valve, a switch valve, and/or a check valve, and/or other connection members, such as a manifold, may also be provided to the hydrogen supply piping 100.

The gas-discharge and water-drain piping 40 is a piping for discharging outside discharging gas containing gaseous matters produced by an electrochemical reaction of the fuel cell 20, and draining water containing produced water, one end thereof is connected with the fuel cell 20, and the other end communicates with atmosphere outside, rearward of the fuel cell vehicle 10. The gas-discharge and water-drain piping 40 is made of resin, for example.

Figure 2:
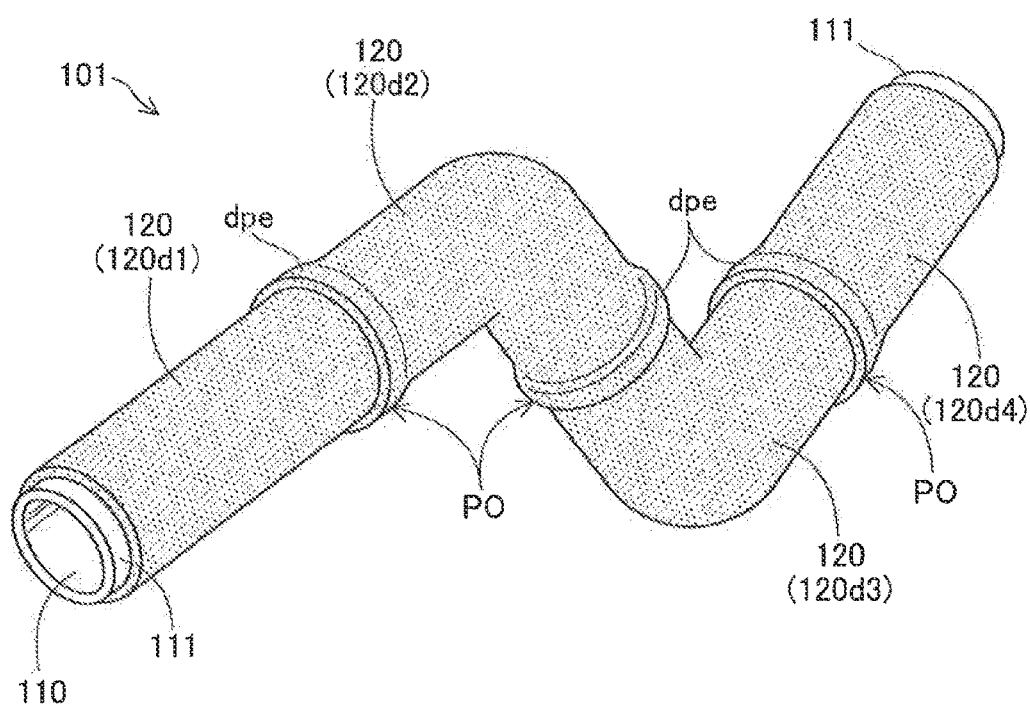
FIG. 2 is a perspective view schematically illustrating a structure of a hydrogen supply piping member.

FIG. 2 is a perspective view schematically illustrating a structure of the hydrogen supply piping member 101. The hydrogen supply piping member 101 includes a flow path pipe member 110 and a coating member 120. The flow path pipe member 110 is a pipe member through which hydrogen flows, and is made of aluminum. The flow path pipe member 110 may be made of any metals other than aluminum, such as iron, carbon steel, stainless steel, and copper.

The coating member 120 is a tube-shaped member for covering an outer surface of the flow path pipe member 110, and is herein comprised of a heat shrinkable tube. The coating member 120 is contracted by heat mainly in a radial direction, and is wrapped tightly around the outer surface 111 of the flow path pipe member 110 which is disposed inside the coating member 120. Although the coating member 120 of this embodiment is made of polyethylene, it may also be made of any other materials, such as polyolefin, fluorine polymer, or thermoplastic elastomer, which is higher in noise insulation than the flow path pipe member 110. Note that the coating member 120 will have a larger thickness at a part wrapping around the flow path pipe member 110 after contraction, as the inner diameter of the coating member 120 increases even if the thickness before thermal contraction does not change. The coating member 120 improves in the noise insulation, as the thickness at the part wrapping around the flow path pipe member 110 after contraction increases. The coating member 120 has a waterproof protective function, such as a waterproof function for protecting the flow path pipe member 110 from fluid such as water, in addition to the noise insulating function. Thus, the corrosion resistance and noise insulation of the hydrogen supply piping member 101 can be improved by covering the flow path pipe member 110 with the coating member 120. Specifically, the coating member 120 prevents fluid such as water adhered to the perimeter of the hydrogen supply piping member 101 from contacting the flow path pipe member 110. Therefore, a corrosion of the flow path pipe member 110 can be prevented. In addition, noise, such as the pulsation noise generated inside the flow path pipe member 110, can be reduced by the coating member 120.

The coating member 120 is divided into a plurality of divided pieces 120d in the pipe axis directions of the hydrogen supply piping member 101. Here, although the coating member 120 is divided into four divided pieces 120d (a first divided piece 120d1, a second divided piece 120d2, a third divided piece 120d3, and a fourth divided piece 120d4), the number of division is not limited. The divided pieces 120d1-120d4 are disposed in the pipe axis direction of the hydrogen supply piping member 101 so that at least one of the ends (open ends) dpe on both sides of one pipe axis direction overlaps with the opposing end dpe of another adjacent divided piece 120d. Here, each of the mutually-overlapping ends dpe of the two adjacent divided pieces 120d is also referred to as "the overlapping portion PO." A sealing function between the ends dpe of the two adjacent divided pieces 120d can be secured by forming the overlapping portion PO. That is, the overlapping portion PO prevents fluid, such as water, from entering into the divided pieces 120d at boundaries between the ends dpe of the two adjacent divided pieces 120d. The divided pieces 120d are tightly wrapped around the outer surface 111 of the flow path pipe member 110 by thermal contraction. Thus, the sealing function between the divided pieces 120d and the flow path pipe member 110 is secured. Note that adhesives may be applied to inner surfaces of the divided pieces 120d. In such a case, an adhesive layer can be formed between the divided pieces 120d and the flow path pipe member 110 when the divided pieces 120d is wrapped tightly around the outer surface 111 of the flow path pipe member 110. Thus, the sealing function between the divided pieces 120d and the flow path pipe member 110 can further be improved.

FIG. 3 is a cross-sectional view of the hydrogen supply piping member 101 in the pipe axis direction. The hydrogen supply piping member 101 is provided with a plurality of curved portion CP so that the hydrogen supply piping member 101 is formed in a shape corresponding to a space in the fuel cell vehicle 10 (FIG. 1) where the hydrogen supply piping member 101 is used. The hydrogen supply piping member 101 has substantially straight extended portions SP at least one of between two curved portions CP and between the curved portion CP and the end EP of the hydrogen supply piping member 101. Here, the overlapping portions PO of the adjacent divided pieces 120d is located at positions other than the curved portions CP of the hydrogen supply piping member 101. That is, the overlapping portions PO) are disposed in the extended portions SP of the hydrogen supply piping member 101. Thus, the sealing function between the ends dpe of the adjacent divided pieces 120d can more fully be secured. This is because a distortion caused in the extended portion SP is smaller than that of the curved portion CP when a stress is applied to the hydrogen supply piping member 101 due to vibration etc. in use of the hydrogen supply piping member 101. Therefore, the sealing between the ends dpe of the adjacent divided pieces 120d can be prevented from being lost by providing the overlapping portions PO in the extended portions SP, when the stress is applied to the hydrogen supply piping member 101.

In a posture of the hydrogen supply piping 100 in use, the overlapping portion PO is configured so that the end dpe of one of the adjacent divided pieces 120d located relatively above covers over the end dpe of the other divided piece 120d located relatively below. Specifically, if the vertical direction of FIG. 3 corresponds to the vertical direction of the posture of the hydrogen supply piping member 101 in use, the second divided piece 120d2 is located relatively above the first divided piece 120d1 and the third divided piece 120d3 which are adjacent to the second divided piece 120d2. Therefore, one end dpe2a of the second divided piece 120d2 covers one end dpe1b of the first divided piece 120d1, and the other end dpe2b of the second divided piece 120d2 covers one end dpe3a of the third divided piece 120d3. Further, the third divided piece 120d3 is located relatively below the adjacent fourth divided piece 120d4. Therefore, the other end dpe3b of the third divided piece 120d3 is placed inside one end dpe4a of the fourth divided piece 120d4. Thus, the sealing function between the ends dpe of the adjacent divided pieces 120d can more fully be secured. Specifically, when the hydrogen supply piping member 101 is used, even if fluid, such as water, adhered to the upper divided pieces 120d moves to the lower divided pieces 120d, the fluid can be further prevented from entering into the upper divided pieces 120d from the ends dpe of the lower divided pieces 120d.

FIG. 4 is a chart illustrating a method of manufacturing the hydrogen supply piping member 101 of the first embodiment. First, as illustrated in a part (a) of FIG. 4, the flow path pipe member 110 which is not yet bent is prepared. Then, as illustrated in a part (b) of FIG. 4, the prepared flow path pipe member 110 is bent. The curved portions CP are formed by the bending and, thus, the hydrogen supply piping member 101 after manufacturing becomes in the shape corresponding to a space where the hydrogen supply piping member 101 is used.

Next, as illustrated in a part (c) of FIG. 4, the divided pieces 120d1-120d4 of the coating member 120 are attached in this order to the bent flow path pipe member 110. Here, in the posture of the manufactured hydrogen supply piping member 101 in use, each overlapping portion PO is formed so that the end dpe of one of the adjacent divided pieces 120d which is located relatively above covers the end dpe of the other divided pieces 120d which is located relatively below. Further, the overlapping portions PO are formed at positions other than the curved portions CP. Then, as illustrated in a part (d) of FIG. 4, the divided pieces 120d attached to the flow path pipe member 110 are heated and thermally contracted so that the divided pieces 120d wrap tightly over the outer surface 111 of the flow path pipe member 110. As described above, the hydrogen supply piping member 101 is manufactured. Thus, in the manufacturing method of this embodiment, since the coating member 120 is divided into the plurality of divided pieces 120d, the coating member 120 can be attached to the flow path pipe member 110 even after the flow path pipe member 110 is bent. Therefore, according to the manufacturing method of this embodiment, it is not necessary to bend the flow path pipe member 110 after the coating member 120 is wrapped tightly around the flow path pipe member 110. Therefore, since the coating member 120 can easily be wrapped tightly around the outer surface 111 of the flow path pipe member 110 after being bent even if the coating member 120 has a large thickness after thermal contraction, the noise insulation of the hydrogen supply piping member 101 can be improved.

FIG. 5 is a chart illustrating a method of manufacturing a hydrogen supply piping as a comparative example. As illustrated in a part (a) of FIG. 5, a straight flow path pipe member 110 which is not yet bent is prepared. Then, as illustrated in a part (b) of FIG. 5, a coating member 120 having substantially the same length as the flow path pipe member 110 is attached to the prepared flow path pipe member 110. The reason why the coating member 120 is attached before the flow path pipe member 110 is bent is that it is difficult to attach the coating member 120 to the flow path pipe member 110 after the flow path pipe member 110 is bent. That is, if the coating member 120 is tried to be attached to the flow path pipe member 110 after being bent, the long coating member 120 is caught in the curved portion(s) CP of the flow path pipe member 110 and, thus, the coating member 120 cannot be completely attached.

After the coating member 120 is attached to the flow path pipe member 110, the coating member 120 is heated and thermally contracted to wrap tightly around the outer surface 111 of the flow path pipe member 110, as illustrated in a part (c) of FIG. 5. After the coating member 120 is wrapped tightly around the flow path pipe member 110, the flow path pipe member 110 is bent into a particular shape, as illustrated in a part (d) of FIG. 5. The reason why the bending is performed after thermal contraction is that, if a force is applied from outside the coating member 120 before thermal contraction to the flow path pipe member 110 inside the coating member 120, the coating member 120 moves with respect to the flow path pipe member 110 and, therefore, the intended bending cannot be performed. According to such a manufacturing method of the comparative example, in a case where the coating member 120 having a large thickness after thermal contraction is used, the coating member 120 may be damaged when the flow path pipe member 110 after the coating member 120 is wrapped tightly around the flow path pipe member 110 is bent. Therefore, in the manufacturing method of the comparative example, only the coating member 120 having a relatively small thickness after thermal contraction can be used. However, even if the coating member 120 with the small thickness after thermal contraction is provided with a waterproof protective function, it does not have a sufficient noise insulating function. Therefore, a hydrogen supply piping member having the sufficient noise insulation cannot be manufactured by the manufacturing method of the comparative example.

According to the hydrogen supply piping 100 of this embodiment described above, since the coating member 120 can be attached to the flow path pipe member 110 after being bent by dividing the coating member 120, it is not necessary to bend the flow path pipe member 110 after the coating member 120 is wrapped tightly around the flow path pipe member 110. Therefore, even if the coating member 120 has the large thickness, the damages to the coating member can be prevented during the bending. Therefore, the noise isolation function can fully be secured in addition to the waterproof function.

Modifications

The present invention is not limited to the embodiment described above, but can be implemented in various forms without departing from the scope of the invention. For example, the following modifications may be possible.

Modification 1

In the posture of the hydrogen supply piping member 101 in use, the overlapping portion PO of this embodiment is configured so that the end dpe of one of the divided pieces 120d which is located relatively above covers the end dpe of the other divided piece 120d which is located relatively below. However, the overlapping portion PO may be configured so that the end dpe of the divided piece 120d located relatively below may cover the end dpe of the divided piece 120d located relatively above. Even in such a case, the sealing function between the ends dpe of the adjacent divided pieces 120d can fully be secured. Note that it is more preferred in terms of more fully securing the sealing function if the overlapping portion PO is configured so that the end dpe of the divided piece 120d located relatively above covers the end dpe of the divided piece 120d located relatively below.

The overlapping portions PO of this embodiment are disposed at positions of the hydrogen supply piping member 101 other than the curved portions CP. However, the overlapping portions PO may also be disposed at the curved portions CP of the hydrogen supply piping member 101. Even in such a case, the sealing function between the ends dpe of the adjacent divided pieces 120d can fully be secured. Note that it is more preferred in terms of more fully securing the sealing function if the overlapping portions PO are disposed at positions of the hydrogen supply piping member 101 other than the curved portions CP.

Modification 2

The number of division and the number of constituent members illustrated in the embodiment described above are merely illustration and are not limited to the illustrated numbers. For example, the hydrogen supply piping 100 of the embodiment described above has the structure in which the hydrogen supply piping members 101 and 102 are connected by the connection 103. However, the hydrogen supply piping 100 may be comprised of a single hydrogen supply piping member, or may be comprised of three or more hydrogen supply piping members. Further, no connection 103 may be provided.

Although the hydrogen supply piping 100 of the embodiment described above is mounted to the fuel cell vehicle 10, it may also be used at places other than the fuel cell vehicle 10. Even in such a case, the noise insulation of the hydrogen supply piping can also be improved.

What is claimed is:

1. A method of manufacturing a hydrogen supply piping for supplying hydrogen to a fuel cell, comprising:
   providing a flow path pipe member through which the hydrogen flows;
   bending the flow path pipe member to form a curved portion and a substantially straight extended portion connected with the curved portion in the flow path pipe member;
   inserting an axial end of the bent flow path pipe member into an axial end opening of each of a plurality of tubular divided pieces in a direction parallel to a central axis of a respective one of the tubular divided pieces, wherein each of the tubular divided pieces is obtained by dividing a heat-shrinkable coating member having a tube shape, so as to sequentially attach the plurality of tubular divided pieces to the bent flow path pipe member; and
   thermally contracting the plurality of tubular divided pieces attached to the flow path pipe member to wrap the plurality of tubular divided pieces tightly around an outer surface of the flow path pipe member,
   wherein the inserting attaches the plurality of tubular divided pieces to the flow path pipe member in such a way that an overlapping portion that is a portion of adjacent tubular divided pieces where ends of the adjacent tubular divided pieces are mutually overlapped is located in the substantially straight extended portion.

2. The manufacturing method in accordance with claim 1, wherein the inserting includes attaching the tubular divided pieces so that, in a posture of the manufactured hydrogen supply piping in use, an end of each of the adjacent tubular divided pieces located at a relatively higher level in the direction of gravity relative to an end of an adjacent tubular divided piece covers an end of an adjacent tubular divided piece located at a relatively lower level in the direction of gravity.

* * * * *